(12) United States Patent
Park et al.

(10) Patent No.: US 9,414,007 B2
(45) Date of Patent: Aug. 9, 2016

(54) DISPLAY APPARATUS AND CONTROL METHOD THEREOF

(71) Applicant: SAMSUNG ELECTRONICS CO., LTD., Suwon-si (KR)

(72) Inventors: Jeong-kee Park, Seongnam-si (KR); Min-suk Seo, Suwon-si (KR); Jong-po Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 14/292,996

(22) Filed: Jun. 2, 2014

(65) Prior Publication Data

US 2015/0015795 A1 Jan. 15, 2015

(30) Foreign Application Priority Data

Jul. 11, 2013 (KR) ........................ 10-2013-0081407

(51) Int. Cl.
*H04N 5/50* (2006.01)
*H04N 5/445* (2011.01)
*H04H 40/90* (2008.01)
*H04H 20/63* (2008.01)
(Continued)

(52) U.S. Cl.
CPC ................. *H04N 5/50* (2013.01); *H04H 20/63* (2013.01); *H04H 40/90* (2013.01); *H04N 5/445* (2013.01); *H04N 21/4383* (2013.01); *H04N 21/44008* (2013.01); *H04N 21/4425* (2013.01); *H04N 21/4882* (2013.01); *H04N 21/6143* (2013.01)

(58) Field of Classification Search
CPC .................... H04N 21/44008; H04N 21/6143; H04N 21/4383; H04N 21/4425; H04N 21/4882; H04N 5/445; H04N 5/50; H04N 5/4401; H04N 5/44591; H04H 40/90; H04H 20/63

See application file for complete search history.

(56) References Cited

U.S. PATENT DOCUMENTS

2002/0087973 A1   7/2002  Hamilton et al.
2006/0174282 A1*  8/2006  Dennison ............... H04H 40/90
                                                      725/68

(Continued)

FOREIGN PATENT DOCUMENTS

DE        197 49 120 A1      6/1999
DE    10 2008 010 142 A1     8/2009
EP         2 001 233 A2     12/2008

OTHER PUBLICATIONS

Communication from the European Patent Office issued Mar. 5, 2015 in a counterpart European Application No. 14153567.4.

(Continued)

*Primary Examiner* — Brian Yenke
*Assistant Examiner* — Sean Haiem
(74) *Attorney, Agent, or Firm* — Sughrue Mion, PLLC

(57) ABSTRACT

A display apparatus includes a communicator which is configured to transmit and receive signals to and from a signal receiver; an image processor which is configured to process an image; a display unit which configured to display the processed image; a storage which is configured to store characteristic information of a channel corresponding to the image; and a controller which is configured to transmit a control signal for changing the channel to the signal receiver, extract channel information contained in a signal received from the signal receiver after transmitting the control signal, compare the extracted channel information and the characteristic information of the channel, and control the channel to be changed based on comparison results.

22 Claims, 9 Drawing Sheets

(51) Int. Cl.
*H04N 21/438* (2011.01)
*H04N 21/4425* (2011.01)
*H04N 21/488* (2011.01)
*H04N 21/61* (2011.01)
*H04N 21/44* (2011.01)

(56) References Cited

U.S. PATENT DOCUMENTS

2007/0277214 A1* 11/2007 Kim ............... H04N 5/44591
725/131
2008/0129878 A1* 6/2008 Hong ............... H04N 5/4401
348/720

OTHER PUBLICATIONS

Communication dated Jun. 2, 2014 issued by the European Patent Office in counterpart European Patent Application No. 14153567.4.

Communication dated Dec. 1, 2015, issued by the European Patent Office in counterpart European Application No. 14153567.4.

Oral Proceedings issued Jun. 10, 2016, issued by the European Patent Office in counterpart European Patent Application No. 14153567.4.

Decision to refuse issued Jun. 10, 2016, issued by the European Patent Office in counterpart European Patent Application No. 14153567.4.

* cited by examiner

<SYSTEM 1>

<SYSTEM 2>

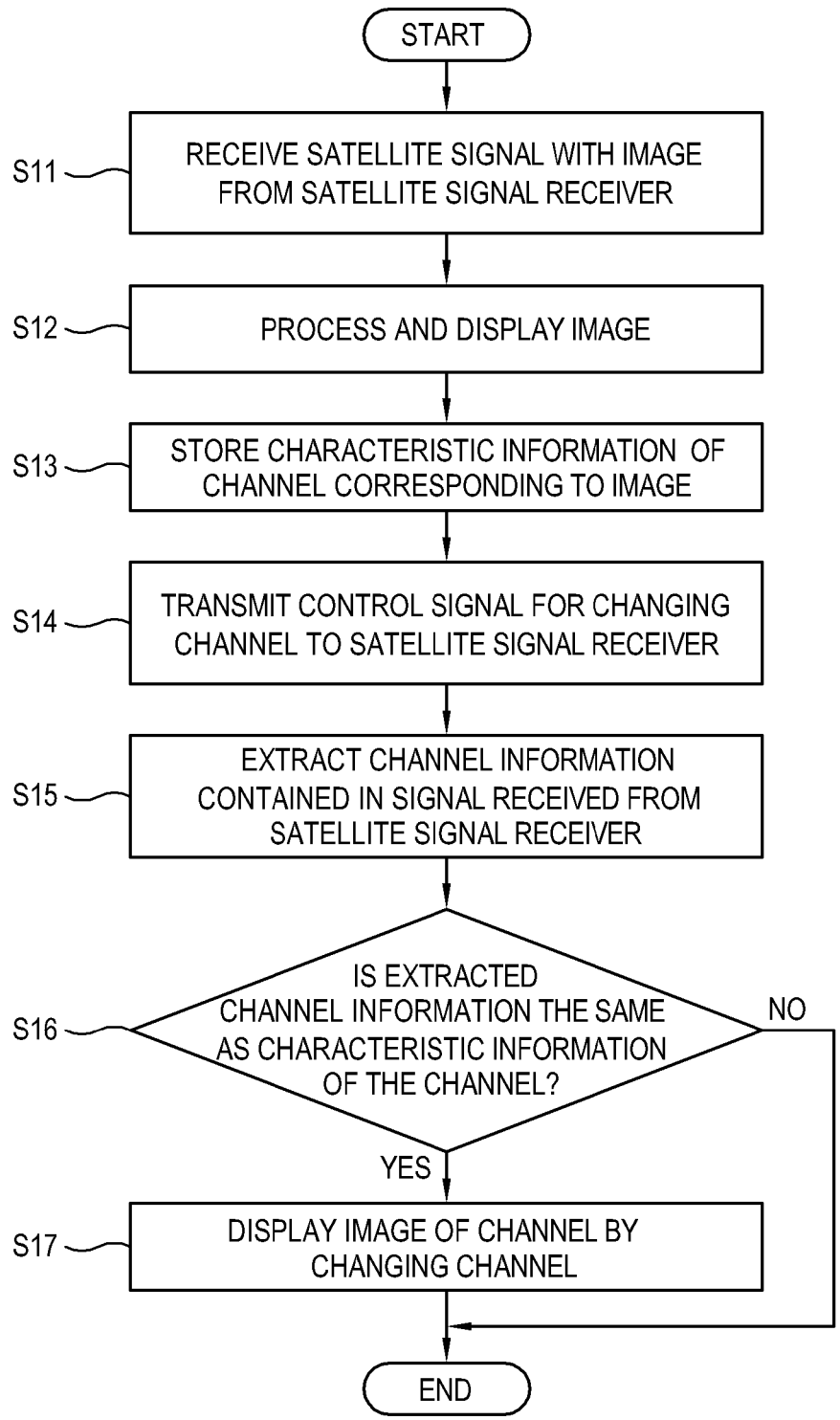

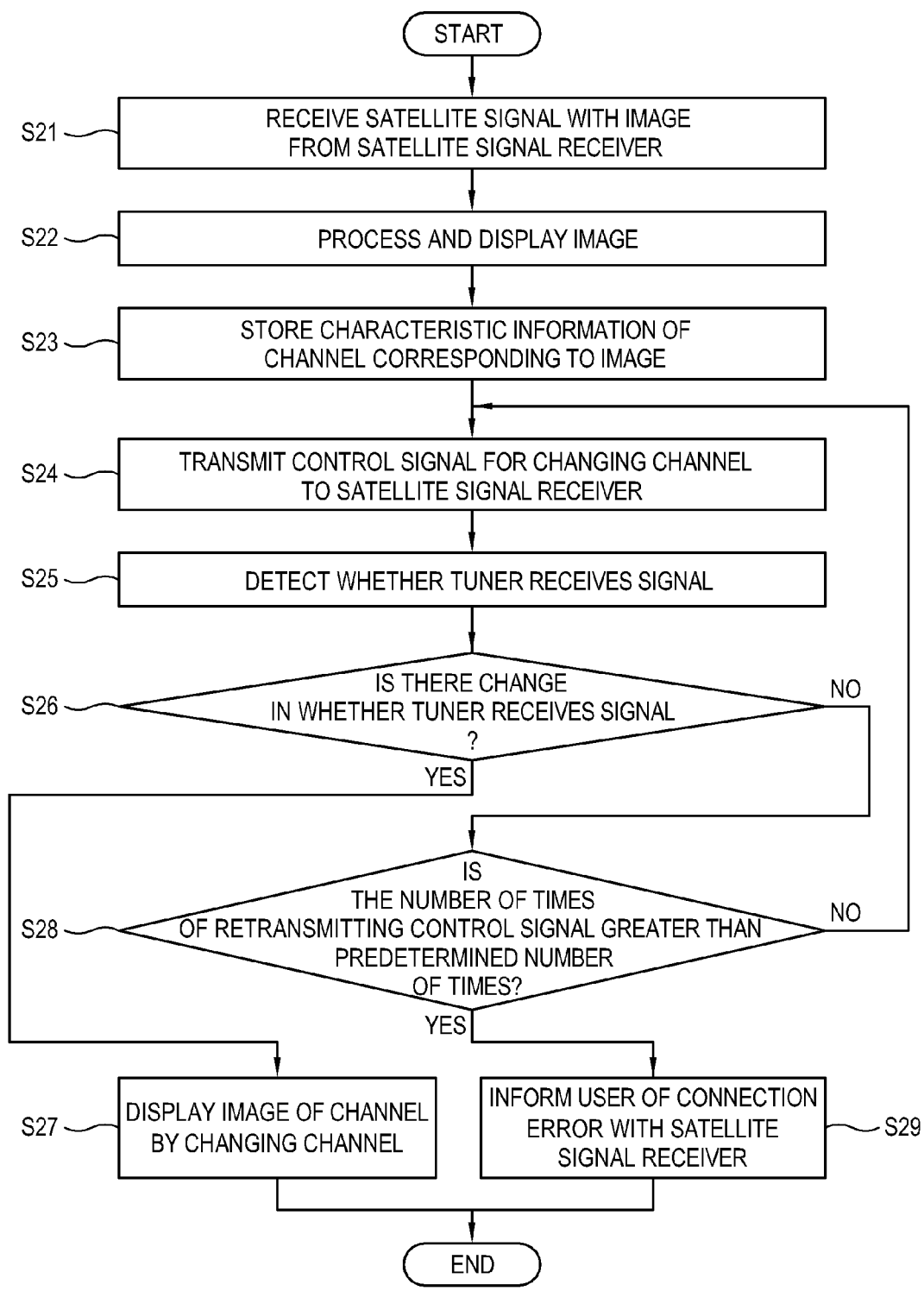

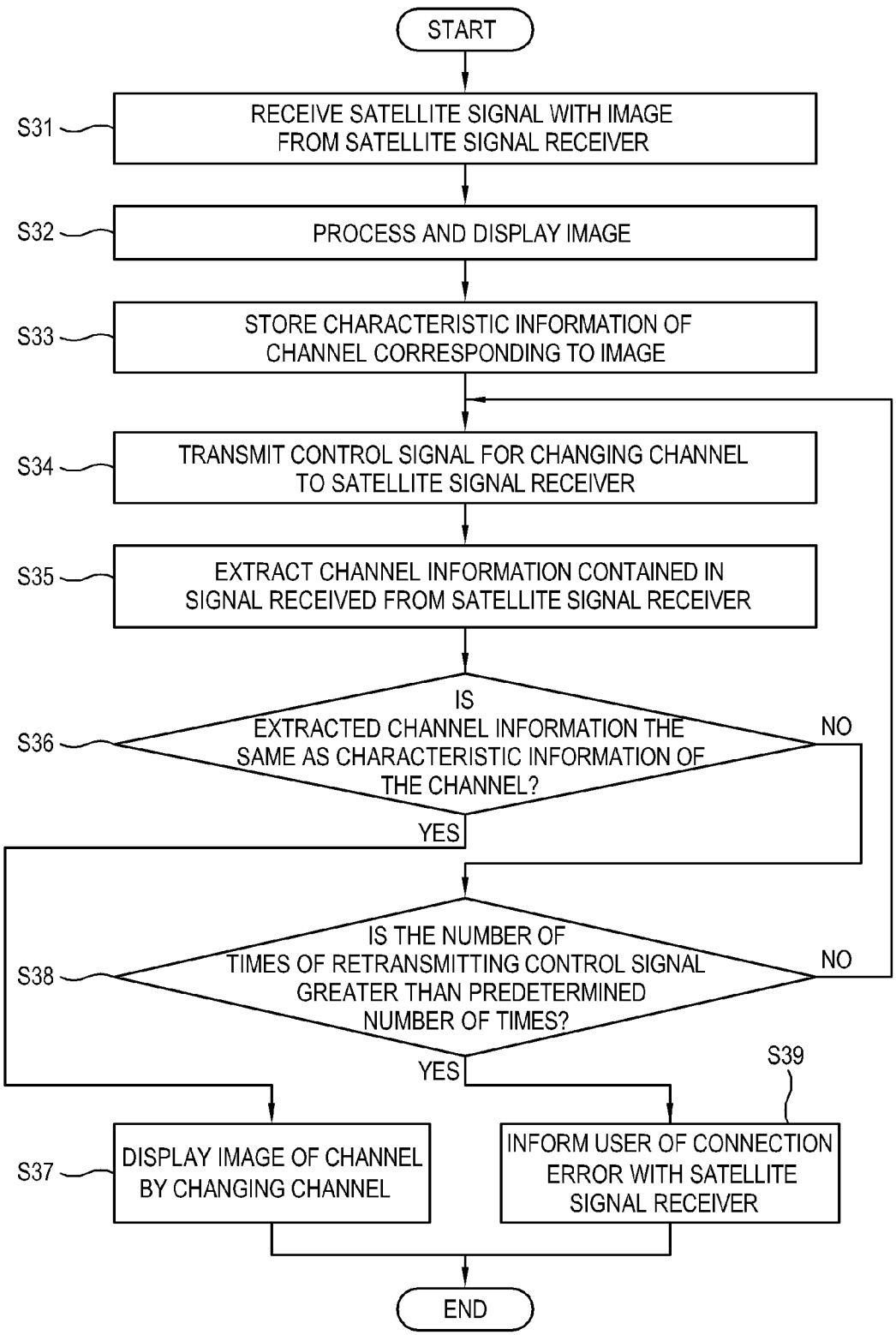

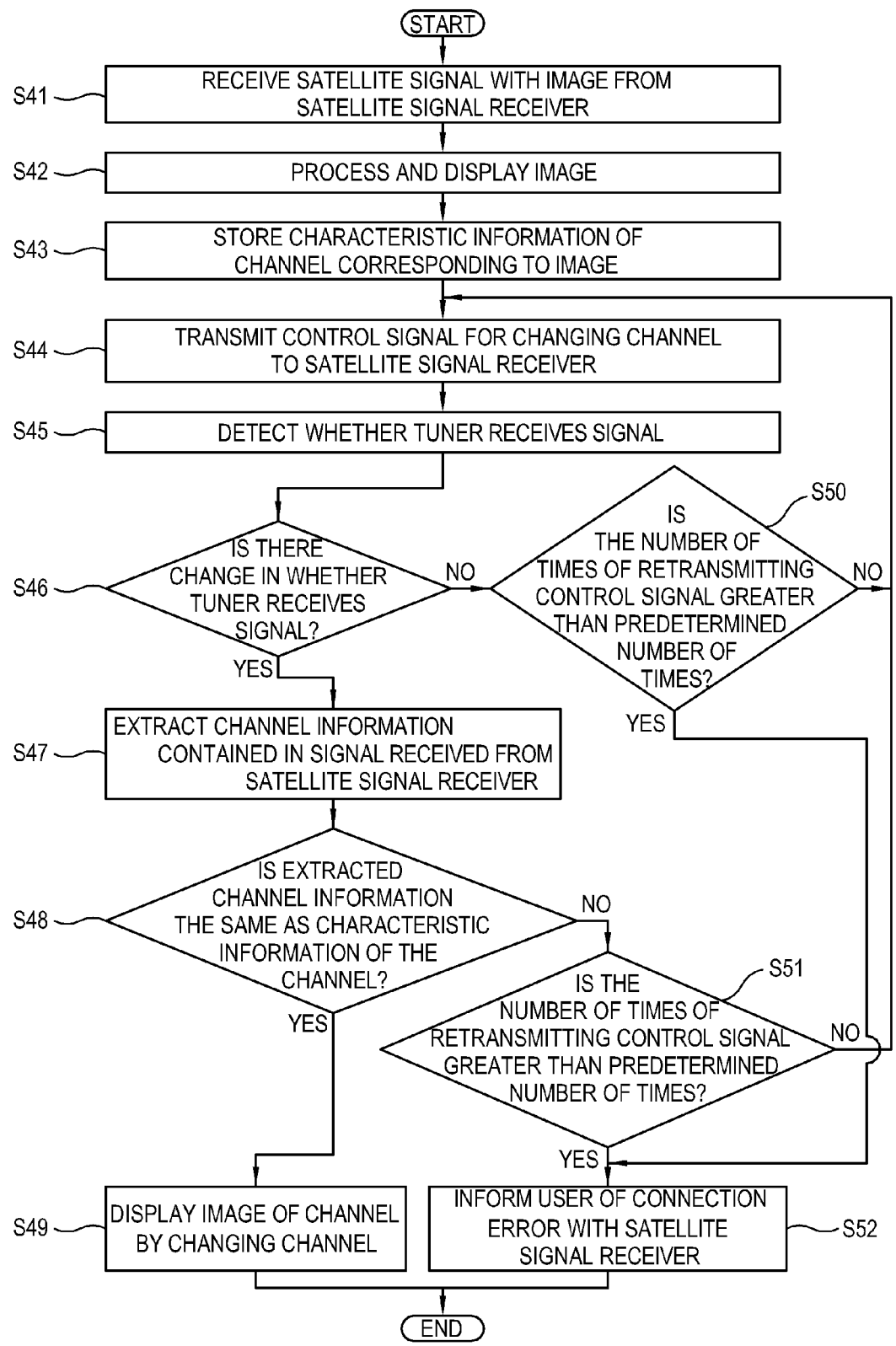

DISPLAY APPARATUS AND CONTROL METHOD THEREOF

CROSS-REFERENCE TO RELATED APPLICATION

This application claims priority from Korean Patent Application No. 10-2013-0081407, filed on Jul. 11, 2013 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly to a display apparatus and a control method thereof, which can determine a trouble in transmitting a control signal due to channel change and a trouble in a satellite signal receiver between the display apparatus and the satellite signal receiver connected through unidirectional communication.

2. Description of the Related Art

To watch a satellite signal, a communication method of a unicable system is used. As shown in FIG. 1, the unicable system includes a satellite signal receiving device 2 (i.e., a satellite the receiver) for receiving a signal, a multi switch 10, a single cable interface (SCIF) line 30, a power splitter/socket 40, and a plurality of the receivers 50.

In the communication method of the unicable system, each receiver transmits a control signal to the multi switch in accordance with a digital satellite equipment control (DiSEqC) format. As shown in FIG. 2, when a control signal is transmitted, a power level is transformed from 13V into 18V, and the control signal is carried thereon.

However, since a plurality of the receivers may be connected to a single switch, the switch distributes slots voluntarily configured by the switch to the respective receivers one by one.

The SCIF line is unidirectional, and thus the receiver transmits a control signal through 18V line control. Ideally, the control signal is transmitted between the receivers in different time domains. However, if the control signal is transmitted in the same time domain, it is impossible to avoid collision. As shown in FIG. 3, there is no collision between the first control signals transmitted from the receiver 1 and the receiver 2, while there is collision between the second control signals transmitted from the receiver 1 and the receiver 2.

FIG. 4 shows that the control signals are not transmitted to the multi switch due to the collision between two the receivers. The receiver 1 cannot transmit the control signal to the multi switch due to interference with another receiver while transmitting the control signal. If the control signal is to change a channel, the receiver 1 may expect that the satellite signal is changed after an operation for the channel change without knowing that the control signal is not transmitted. However, the multi switch is transmitting the signal corresponding to the existing channel to the receiver 1 since it receives no control signal.

Thus, in this case, the receiver 1 cannot display a changed channel because it does not receive any information about the channel to be changed.

Accordingly, a user expects a channel to be changed without knowing why the channel is not changed, or requests service about transmission of a satellite signal, thereby having increased complaints.

SUMMARY

One or more exemplary embodiments may provide a display apparatus and a control method thereof, in which a control signal is transmitted from the display apparatus to the satellite signal receiver, a channel to be changed is displayed or the control signal is retransmitted by determining whether the control signal is transmitted to the satellite signal receiver, and a user is informed of a trouble in connection between the display apparatus and the satellite signal receiver.

According to an aspect of another exemplary embodiment, a display apparatus may include a communicator which is configured to transmit and receive signals to and from a signal receiver; an image processor which is configured to process an image; a display unit which is configured to display the processed image; and a controller which is configured to transmit a control signal for changing the channel, to the signal receiver, extracts channel information contained in a signal received from the signal receiver after transmitting the control signal, compare the extracted channel information and characteristic information of the channel corresponding to the image, and control the channel to be changed based on comparison results.

The display apparatus further may include a tuner which is configured to select the channel, wherein the controller controls the channel to be changed based on a change in whether the tuner receives a signal.

The controller may display an image of the changed channel if it is determined that there is the change in whether the tuner receives a signal.

The controller may retransmit the control signal to the signal receiver if it is determined that there is no change in whether the tuner receives a signal.

The controller may display an image of the changed channel if the extracted channel information and the characteristic information of the channel are the same.

The controller may retransmit the control signal to the signal receiver if the extracted channel information and the characteristic information of the channel are not the same.

The controller may stop retransmitting the control signal and inform a user of an error in connection with the signal receiver if a number of times of retransmitting the control signal is greater than a predetermined number of times.

The controller may stop retransmitting the control signal and inform a user of an error in connection with the signal receiver if the number of times of retransmitting the control signal is greater than a predetermined number of times.

The characteristic information of the channel may include at least one from among transmission frequency for video and audio of the channel, identification information and service identification information.

According to an aspect of another exemplary embodiment, a control method of a display apparatus may include receiving a signal containing an image from a signal receiver; processing the image to be displayed; storing characteristic information of a channel corresponding to the image; transmitting a control signal for changing the channel to the signal receiver; extracting channel information contained in a signal received from the signal receiver after transmitting the control signal; comparing the extracted channel information and the characteristic information of the channel; and controlling the channel to be changed based on comparison results.

The transmitting the control signal may include controlling the channel to be changed based on a change in whether a tuner receives a signal.

The controlling the channel to be changed may include detecting whether the tuner receives a signal; and displaying an image of the changed channel if it is determined that there is the change in whether the tuner receives a signal.

The detecting whether the signal is received may include retransmitting the control signal to the signal receiver if it is determined that there is no change in whether the tuner receives a signal.

The controlling the channel to be changed may include displaying an image of the changed channel if the extracted channel information and the stored characteristic information of the channel are the same.

The comparing may include retransmitting the control signal to the signal receiver if the extracted channel information and the stored characteristic information of the channel are not the same.

The retransmitting may include stopping retransmitting the control if a number of times of retransmitting the control signal is greater than a predetermined number of times, and informing of an error in connection with the signal receiver.

The retransmitting may include stopping retransmitting the control if a number of times of retransmitting the control signal is greater than a predetermined number of times, and informing of an error in connection with the signal receiver.

The characteristic information of the channel may include at least one from among transmission frequency for video and audio of the channel, identification information and service identification information.

BRIEF DESCRIPTION OF THE DRAWINGS

The above and/or other aspects will become apparent and more readily appreciated from the following description of exemplary embodiments, taken in conjunction with the accompanying drawings, in which:

FIG. 7 is a control flowchart showing operations of the display apparatus according to an exemplary embodiment; and FIGS. 8 to 10 are exemplary control flowcharts showing operations of the display apparatus according to an exemplary embodiment.

DETAILED DESCRIPTION OF EXEMPLARY EMBODIMENTS

Below, exemplary embodiments will be described in detail with reference to accompanying drawings. Exemplary embodiments may be achieved in various forms and are not limited to examples set forth herein. For convenience of description, parts that are not directly related to the exemplary embodiments are omitted, and like numerals refer to the same or similar elements throughout.

Figure 1:
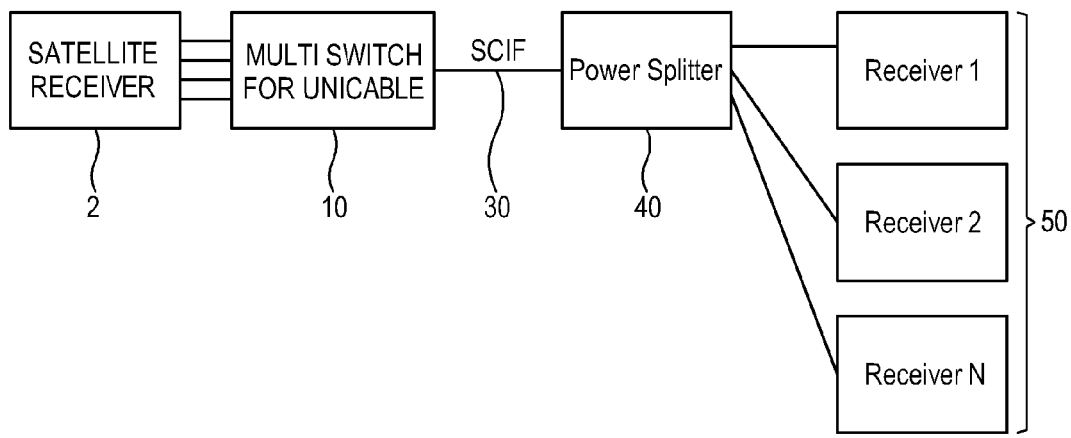
FIG. 1 is an exemplary view showing a configuration of a conventional unicable system.
Figure 1:
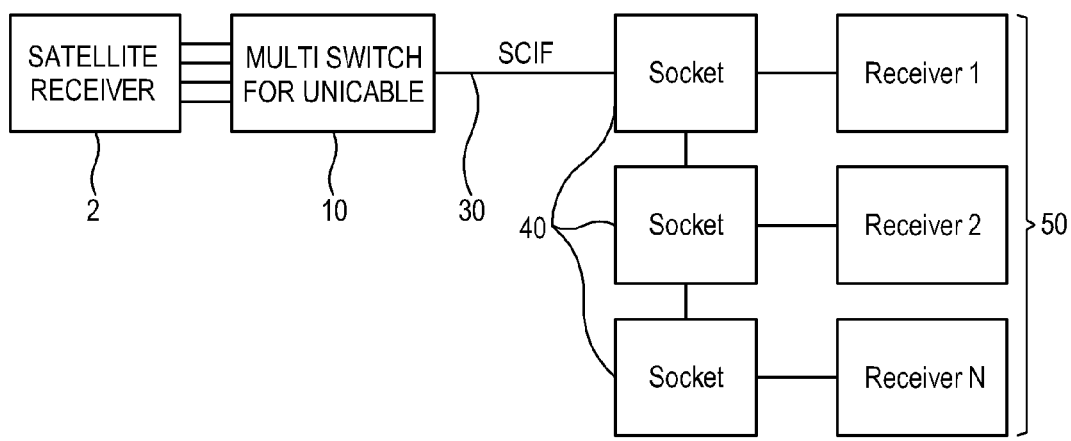
Figure 2:
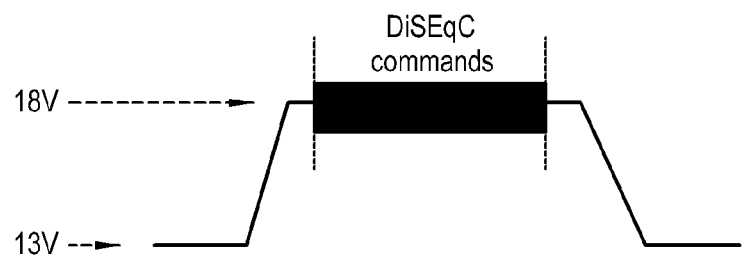
FIG. 2 is an exemplary graph showing a communication method of transmitting a control signal in the conventional unicable system.
Figure 3:
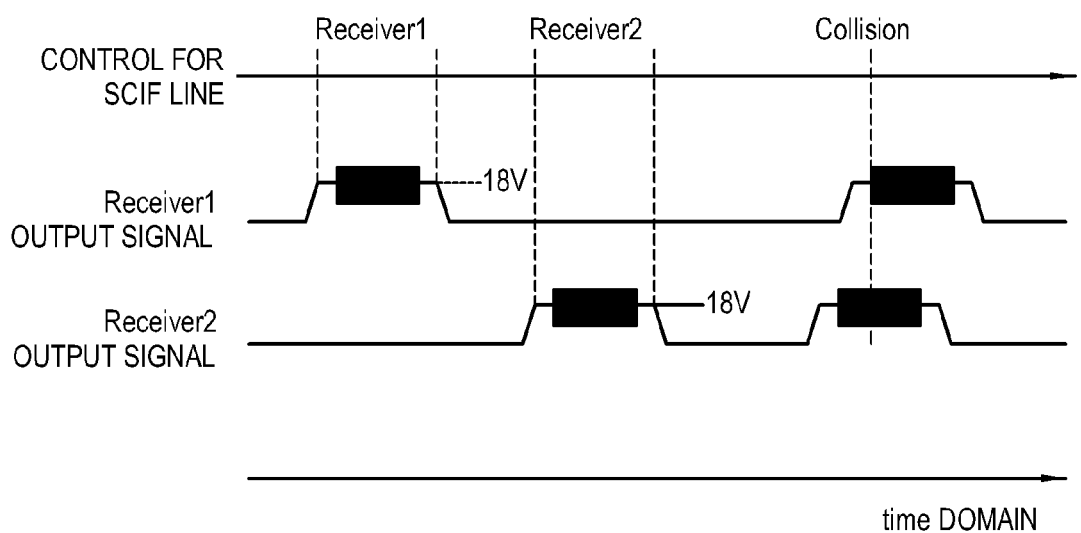
FIG. 3 is an exemplary graph showing collision between control signals in the conventional unicable system.
Figure 4:
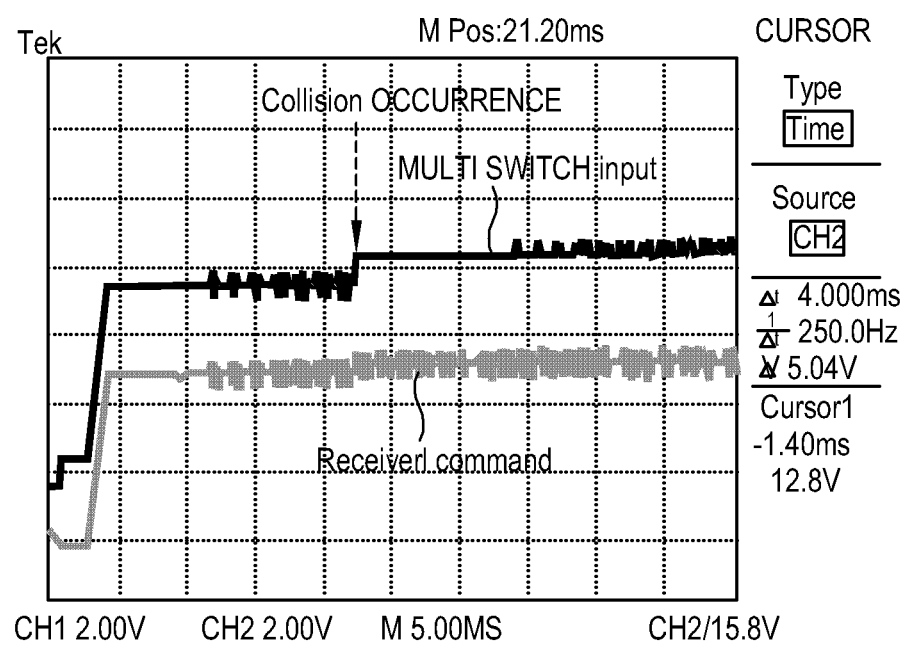
FIG. 4 is an exemplary view showing signal variation due to the collision between the control signals in FIG. 3.
Figure 5:
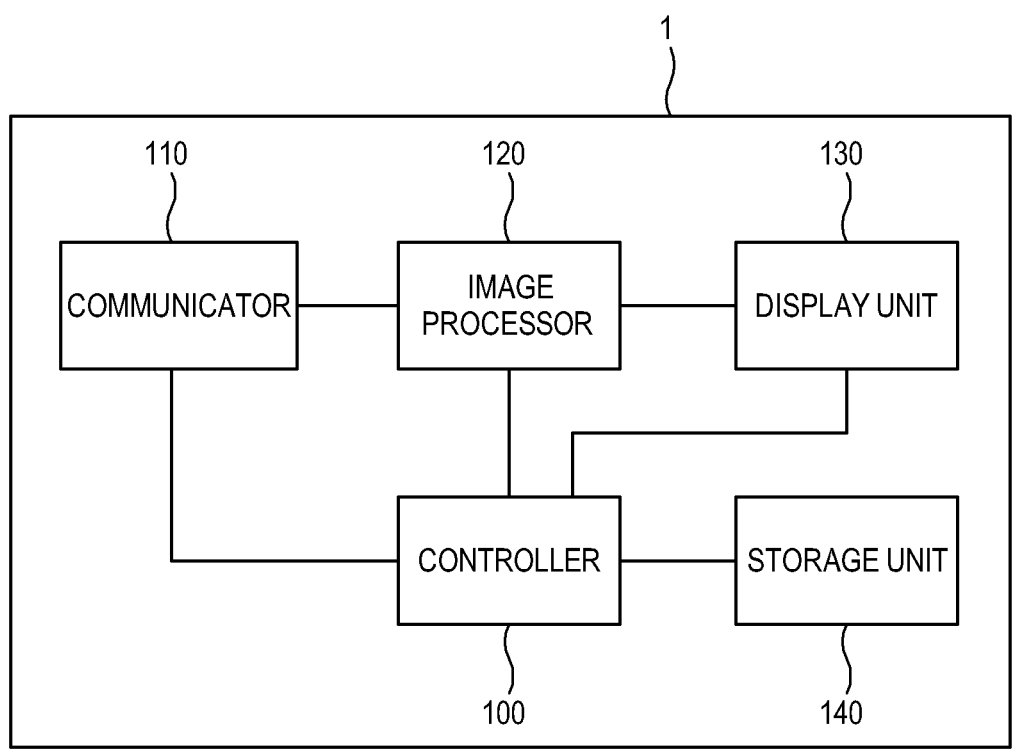
FIG. 5 is a block diagram showing a configuration of a display apparatus according to an exemplary embodiment.

FIG. 5 is a block diagram showing a configuration of a display apparatus 1 according to an exemplary embodiment. As shown in FIG. 5, the display apparatus 1 according to an exemplary embodiment may include a communicator 110, an image processor 120, a display unit 130, a storage unit 140, and a controller 100. The display apparatus 1 according to an exemplary embodiment may be achieved by a Smart television (TV), a set-top box, a Smart personal computer (PC), etc.

The communicator 110 may wirelessly receive a signal through preset wireless communication standards, or may receive a signal from an external input through connection of various external input cables.

The communicator 110 may include a plurality of connectors (not shown) to which individual cables are respectively connected. The communicator 110 may receive a signal from a connected external input, for example, receives a broadcasting signal, a video signal, a data signal, etc. based on a high definition multimedia interface (HDMI), a universal serial bus (USB), and component standards, or receive communication data through a communication network.

The communicator 110 may further include not only a configuration for receiving a signal/data from an external input, but also various additional configurations such as a wireless communication (not shown) for wireless communication or a tuner (not shown) for selecting a broadcasting signal in accordance with design methods of the display apparatus 1. The communicator 110 may transmit information/data/signal of the display apparatus 1 to an external device as well as it receives a signal from the external device. That is, the communicator 110 is not limited to a configuration of only receiving a signal from the external device, and may be achieved by an interactively communicable interface. The communicator 110 may receive a control signal for selecting a user interface (UI) from a plurality of control devices, and may transmit and receive a signal to and from the satellite signal receiver 2. The communicator 110 may be achieved by a publicly known communication module such as Bluetooth, infrared (IR), ultra wideband (UWB), zigbee, etc. for short range wireless communication, or may be achieved by a publicly known communication port for wired communication. The communicator 110 may be used for various purposes such as a display control command, data transmission/reception, etc. besides a control signal for selecting the UI.

The kind of imaging processes implemented in the image processor 120 is not limited, but may for example include decoding for a video format of image data; de-interlacing for converting interlace type image data into progressive type one; scaling for adjusting image data to have a preset resolution; noise reduction, detail enhancement, frame refresh rate conversion, etc., for improving picture quality.

The image processor 120 may be achieved by a system-on-chip (SOC) where various functions are integrated, or an image processing board (not shown) where individual configurations for independently performing the respective processes are mounted on a printed circuit board, and then internally provided in the display apparatus 1.

The image processor 120 may perform various imaging processes previously set with respect to a source image such as a broadcasting signal including a video signal received from the communicator 110 and a video signal received from a video source (not shown). The image processor 120 outputs the processed video signal to the display apparatus 1, so the processed source image can be displayed on the display apparatus 1.

The display unit 130 displays an image based on the video signal output from the image processor 120. The display unit 130 may be achieved by various display methods such as liquid crystal, plasma, a light-emitting diode, an organic light-emitting diode, a surface-conduction electron-emitter, a carbon nano-tube, nano-crystal, etc., but not limited thereto.

The display unit 130 may include additional elements in accordance with achievement methods. For example, if the display unit 130 is a type of the liquid crystal method, the display unit 130 may include a liquid crystal display panel (not shown), a backlight unit (not shown) for emitting light to the display panel, and a panel driving substrate (not shown) driving the display panel (not shown).

The storage unit 140 has to store data even though the display apparatus 1 is turned off, and may be achieved by a non-volatile memory (e.g., a writable read only memory, ROM) so as to reflect changed matter of a user. That is, the storage unit 140 may be provided as one of a flash memory, an erasable programmable read only memory (EPROM), and electrically erasable programmable read only memory (EEPROM). The storage unit 140 may store characteristic information of a channel corresponding to an image.

The controller 100 may perform general control for internal elements of the display apparatus 1. The controller 100 transmits a control signal for changing a channel to the satellite signal receiver 2, extracts channel information contained in the signal received from the satellite signal receiver 2 after transmitting the control signal, compares the extracted channel information with the characteristic information of the channel, and controls the channel to be changed based on the compared results.

Figure 6:
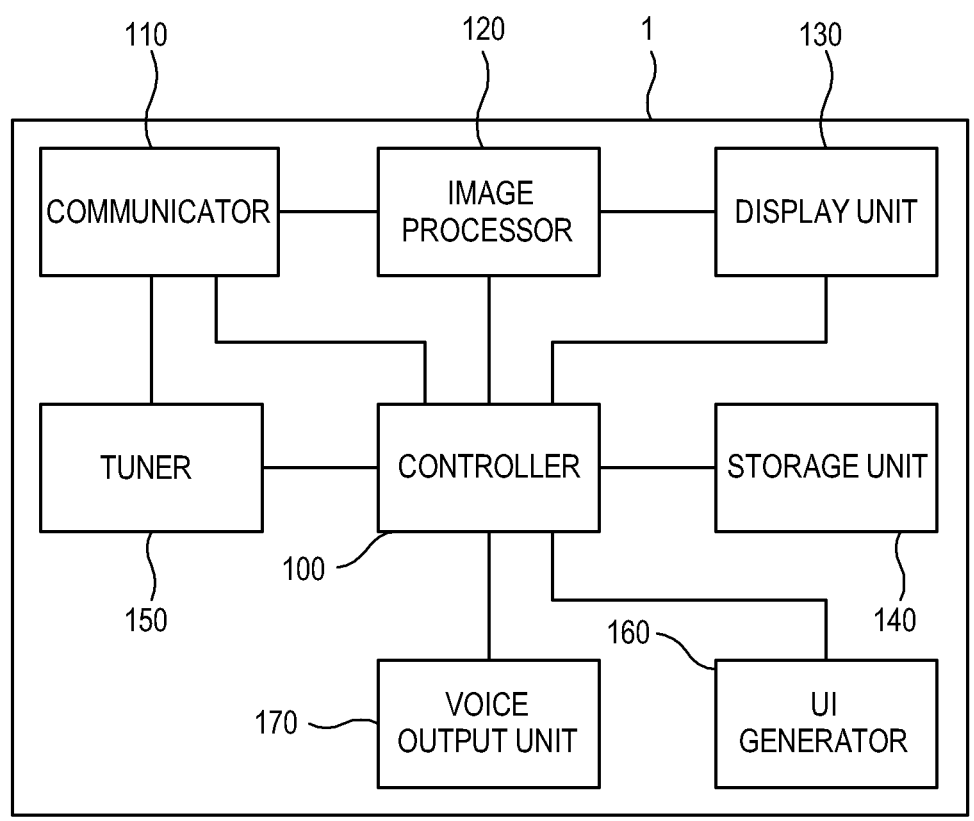
FIG. 6 is a block diagram showing an exemplary configuration of the display apparatus according to an exemplary embodiment.

FIG. 6 is a block diagram showing an exemplary configuration of the display apparatus 1 according to an exemplary embodiment. As shown in FIG. 6, the display apparatus 1 according to an exemplary embodiment includes a user interface (UI) generator 160, a tuner 150, and a voice output unit 170 in addition to the elements of FIG. 5.

The UI generator 160 may generate a UI for operating an executed application program. The generated UI includes a plurality of sub UIs provided in the form of an icon, a text, etc. If a user selects a certain sub UI through a portable terminal, the application program can operate corresponding to the selected sub UI. That is, each sub UI may be generated by a plurality of functions or events for operating the application program being executed in the display apparatus 1.

The UI generator 160 refers to a software or hardware function for generating and controlling a UI displayed on the display unit 130, the functions of which can be implemented by the controller 100 to be described later. In other words, the UI generator 160 may not be achieved by a separate chipset or a separate microprocessor. Under control, the UI generator 160 generates a UI displayed on the display unit 130 and showing an error in connection with the satellite signal receiver 2.

The tuner 150 may be tuned to a satellite signal received from the satellite signal receiver 2, that is, a plurality of channels. Under control of the controller 100, the tuner 150 may be tuned to a channel selected by a user. The satellite signal of the tuned channel is transmitted to the image processor 120 and undergoes the imaging process so that it can be displayed on the display unit.

The voice output unit 170 may be achieved by a loud speaker (not shown), which can inform a user of the connection error with the satellite signal receiver 2 through voice, and the UI may be displayed on the display unit 130 in order to inform a user of the connection error with the satellite signal receiver 2.

The controller 100 may control the receiver 110 to receive control information including at least one of characteristic information, a control key, and a control application of the plurality of electronic devices 4 and the display apparatus 1, and store the control information in the storage unit 140.

The controller 100 controls the channel to be changed based on whether the tuner 150 receives a signal.

The tuner 150 suspends receiving a signal if the channel is changed while receiving the signal, and resumes receiving the signal. By sensing this suspension, it is determined whether the control signal of the channel is transmitted to the satellite signal receiver 2. However, if the channel is not changed, the signal is continuously received and thus there is no change. For example, if a user inputs channel change from a channel No. 6 to a channel No. 9, the display apparatus 1 transmits a control signal corresponding to channel change to the satellite signal receiver 2. If the satellite signal receiver 2 normally receives the control signal corresponding to the channel change, a signal of a changed channel is transmitted to the display apparatus 1. In this case, the tuner 150 does not receives the signal of the channel No. 6 since the satellite signal receiver transmits no signal before receiving a signal of a changed channel. Then, the tuner 150 receives the signal of the changed channel. If a channel is changed, the channel change is detected because there is a change in whether the tuner 150 receives a signal. On the other hand, if a channel is not changed, it is determined that the control signal is normally transmitted, since there is no change in whether the tuner 150 receives a signal.

The controller 100 may control the communicator 110 to receive a user's control command, including at least one of a transmission method to at least one device and an implementation command related to at least one device, from a user, and transmit it to at least one device.

The controller 100 may control an image of a changed channel to be displayed if it is detected and determined that there is change in whether the tuner 150 receives a signal.

The controller 100 may transmit a control signal again to the satellite signal receiver 2 if it is detected and determined that there is no change in whether the tuner 150 receives a signal.

The controller 100 may control an image of a changed channel to be displayed if the extracted channel information and the characteristic information of the stored channel are the same.

The controller 100 transmits a control signal for channel change to the satellite signal receiver 2, and then extracts the channel information included in the signal received from the satellite signal receiver 2. The satellite signal contains channel information such as a transmission frequency for video and audio of each channel, identification information, service identification information, etc., which can be compared with the characteristic information of the channel previously stored in the storage unit 140. For example, when the channel No. 6 is changed into the channel No. 9, the characteristic information is clearly different between the channel Nos. 6 and 9. The control signal for the channel change is transmitted to the satellite signal receiver 2, and then the channel information is extracted from the signal received from the satellite signal receiver 2 and compared with the previously stored characteristic information of the channel, thereby determining whether the channel information of the channel No. 9 is being received as the channel is changed, or whether the channel information of the channel No. 6 is being still received.

The controller 100 may control the control signal to be transmitted again to the satellite signal receiver 2 if the extracted channel information and the stored characteristic information of the channel are not the same.

The controller 100 suspends the retransmission of the control signal if the number of times of retransmitting the control signal is greater than a predetermined number of times, and informs a user of the error in the connection with the satellite signal receiver 2. In order to inform a user of the error in connection between the satellite signal receiver 2 and the display apparatus 1, the controller 100 generates a UI and a voice.

FIG. 7 is a control flowchart showing operations of the display apparatus 1 according to an exemplary embodiment.

A satellite signal containing an image is received from the satellite signal receiver 2 (S11).

The received satellite signal is imaging-processed and displayed on the display unit 130 (S12).

The characteristic information of the channel corresponding to the satellite signal containing the image is stored (S13).

A control signal for changing the channel is transmitted to the satellite signal receiver 2 (S14).

After transmitting the control signal, channel information contained in the signal received from the satellite signal receiver 2 is extracted (S15).

It is determined whether the extracted channel information and the previously stored characteristic information of the channel are the same or not (S16).

If they are the same, the image of the changed channel is displayed on the display unit 130 (S17).

If they are not the same, the control signal is transmitted again, and terminates.

FIG. 8 is a control flowchart showing operations of the display apparatus 1 according to an exemplary embodiment.

A satellite signal containing an image is received from the satellite signal receiver 2 (S21).

The received satellite signal is imaging-processed to be displayed on the display unit 130 (S22).

The characteristic information of the channel corresponding to the satellite signal containing an image is stored (S23).

A control signal for changing the channel is transmitted to the satellite signal receiver 2 (S24).

After transmitting the control signal, change in whether the signal is transmitted from the satellite signal receiver 2 to the tuner 150 is detected (S25).

It is determined whether there is change in whether the tuner 150 receives the signal (S26).

If it is determined that there is change, an image of the changed channel is displayed on the display unit 130 (S27).

If it is determined that there is no change, it is determined whether the number of times of retransmitting the control signal is greater than a predetermined number of times (S28).

If it is determined that the number of times of retransmitting the control signal is not greater than a predetermined number of times, the control signal is retransmitted to the satellite signal receiver 2 (S24).

If it is determined that the number of times of retransmitting the control signal is greater than a predetermined number of times, a user is informed of a connection error between the satellite signal receiver 2 and the display apparatus 1 (S29).

FIG. 9 is a control flowchart showing operations of the display apparatus 1 according to another exemplary embodiment.

A satellite signal containing an image is received from the satellite signal receiver 2 (S31).

The received satellite signal is image-processed to be displayed on the display unit 130 (S32).

The characteristic information of the channel corresponding to the satellite signal containing an image is stored (S33).

A control signal for changing the channel is transmitted to the satellite signal receiver 2 (S34).

After transmitting the control signal, channel information is extracted from the signal received from the satellite signal receiver 2 (S35).

It is determined whether the extracted channel information and the previously stored characteristic information of the channel are the same (S36).

If they are the same, an image of the changed channel is displayed on the display unit 130 (S37).

If they are not the same, it is determined whether the number of times of retransmitting the control signal is greater than a predetermined number of times (S38).

If it is determined that the number of times of retransmitting the control signal is not greater than a predetermined number of times, the control signal is retransmitted to the satellite signal receiver 2 (S34).

If it is determined that the number of times of retransmitting the control signal is greater than a predetermined number of times, a user is informed of a connection error between the satellite signal receiver 2 and the display apparatus 1 (S39).

FIG. 10 is a control flowchart showing operations of the display apparatus 1 according to still another exemplary embodiment.

A satellite signal containing an image is received from the satellite signal receiver 2 (S41).

The received satellite signal is image-processed to be displayed on the display unit 130 (S42).

The characteristic information of the channel corresponding to the satellite signal containing an image is stored (S43).

A control signal for changing the channel is transmitted to the satellite signal receiver 2 (S44).

After transmitting the control signal, change in whether the signal is transmitted from the satellite signal receiver 2 to the tuner 150 is detected (S45).

It is determined whether there is change in whether the tuner 150 receives the signal (S46).

If it is determined that there is change, channel information contained in the signal received from the satellite signal receiver 2 is extracted (S47).

It is determined whether the extracted channel information and the previously stored characteristic information of the channel are the same (S48).

If they are the same, an image of the changed channel is displayed on the display unit 130 (S49).

If it is determined that there is no change at operation S46, it is determined whether the number of times of retransmitting the control signal is greater than a predetermined number of times (S50).

If it is determined that the number of times of retransmitting the control signal is not greater than a predetermined number of times, the control signal is retransmitted to the satellite signal receiver 2 (S44).

If it is determined that the number of times of retransmitting the control signal is greater than a predetermined number of times, a user is informed of connection error between the satellite signal receiver 2 and the display apparatus 1 (S52).

If they are not the same at operation S48, it is determined whether the number of times of retransmitting the control signal is greater than a predetermined number of times (S51).

If it is determined that the number of times of retransmitting the control signal is not greater than a predetermined number of times, a control signal is retransmitted to the satellite signal receiver 2 (S44).

If it is determined that the number of times of retransmitting the control signal is greater than a predetermined number of times, a user is informed of connection error between the satellite signal receiver 2 and the display apparatus 1 (S52).

As described above, in the display apparatus 1 according to an exemplary embodiment, it is determined whether a control signal is transmitted to the satellite signal receiver 2 so as to display a changed channel or retransmit the control signal, so that a user can be informed of trouble in connection between the display apparatus 1 and the satellite signal receiver 2, Accordingly, a user can be easily informed of results from channel change or quickly cope with troubles with connection.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a communicator which is configured to transmit and receive signals to and from a signal receiver;
   an image processor which is configured to process an image;
   a display unit which is configured to display the processed image; and
   a controller which is configured to:
      transmit, through the communicator, a control signal for changing a channel of the signal to be received from the signal receiver, to the signal receiver;
      determine whether a channel is changed corresponding to the transmitted the control signal for changing the channel; and
      if it is determined that the channel of the signal is not changed corresponding to the transmitted control signal for changing the channel, perform at least one among retransmitting the control signal to the signal receiver and informing a user of an error in connection with the signal receiver.

2. The display apparatus according to claim 1, further comprising a tuner which is configured to select the channel, wherein the controller controls the channel to be changed based on a change in whether the tuner receives a signal.

3. The display apparatus according to claim 2, wherein the controller displays an image of the changed channel if it is determined that there is the change in whether the tuner receives a signal from the signal receiver.

4. The display apparatus according to claim 2, wherein the controller retransmits the control signal to the signal receiver if it is determined that there is no change in whether the tuner receives a signal from the signal receiver.

5. The display apparatus according to claim 1, wherein the controller displays an image of the changed channel if the extracted channel information and the characteristic information of the channel are the same.

6. The display apparatus according to claim 1, wherein the controller retransmits the control signal to the signal receiver if the extracted channel information and the characteristic information of the channel are not the same.

7. A display apparatus comprising:
   a communicator which is configured to transmit and receive signals to and from a signal receiver;
   an image processor which is configured to process an image;
   a display unit which is configured to display the processed image; and
   a controller which is configured to transmit a control signal for changing a channel, to the signal receiver, extract channel information contained in a signal received from the signal receiver after transmitting the control signal, compare the extracted channel information and characteristic information of the channel corresponding to the image, and control the channel to be changed based on comparison results,
   wherein the controller retransmits the control signal to the signal receiver if it is determined that there is no change in whether a tuner of the display apparatus receives a signal, and
   wherein the controller stops retransmitting the control signal and informs a user of an error in connection with the signal receiver if a number of times of retransmitting the control signal is greater than a predetermined number of times.

8. A display apparatus comprising:
   a communicator which is configured to transmit and receive signals to and from a signal receiver;
   an image processor which is configured to process an image;
   a display unit which is configured to display the processed image; and
   a controller which is configured to transmit a control signal for changing a channel, to the signal receiver, extract channel information contained in a signal received from the signal receiver after transmitting the control signal, compare the extracted channel information and characteristic information of the channel corresponding to the image, and control the channel to be changed based on comparison results,
   wherein the controller retransmits the control signal to the signal receiver if the extracted channel information and the characteristic information of the channel are not the same, and
   wherein the controller stops retransmitting the control signal and informs a user of an error in connection with the signal receiver if the number of times of retransmitting the control signal is greater than a predetermined number of times.

9. The display apparatus according to claim 1, wherein the characteristic information of the channel comprises at least one from among transmission frequency for video and audio of the channel, identification information and service identification information.

10. A control method of a display apparatus, comprising:
    receiving a signal containing an image from a signal receiver;
    processing the image to be displayed;
    transmitting a control signal for changing a channel of the signal to be received from the signal receiver, to the signal receiver;
    determining whether a channel is changed corresponding to the transmitted the control signal for changing the channel;
    performing at least one among retransmitting the control signal to the signal receiver and informing a user of an error in connection with the signal receiver if it is determined that the channel of the signal is not changed corresponding to the transmitted control signal for changing the channel.

11. The method according to claim 10, wherein the transmitting the control signal comprises: controlling the channel to be changed based on a change in whether a tuner receives a signal.

12. The method according to claim 11, wherein the controlling the channel to be changed comprises:
    detecting whether the tuner receives a signal; and
    displaying an image of the changed channel if it is determined that there is the change in whether the tuner receives a signal from the signal receiver.

13. The method according to claim 12, wherein the detecting whether the signal is received comprises: retransmitting the control signal to the signal receiver if it is determined that there is no change in whether the tuner receives a signal from the signal receiver.

14. The method according to claim 10, wherein the controlling the channel to be changed comprises: displaying an image of the changed channel if the extracted channel information and the stored characteristic information of the channel are the same.

15. The method according to claim 10, wherein the comparing comprises retransmitting the control signal to the signal receiver if the extracted channel information and the stored characteristic information of the channel are not the same.

16. A control method of a display apparatus, comprising:
   receiving a signal containing an image from a signal receiver;
   processing the image to be displayed;
   storing characteristic information of a channel corresponding to the image;
   transmitting a control signal for changing the channel to the signal receiver;
   extracting channel information contained in a signal received from the signal receiver after transmitting the control signal;
   comparing the extracted channel information and the characteristic information of the channel; and
   controlling the channel to be changed based on comparison results,
   wherein the controlling the channel to be changed comprises detecting whether the tuner receives a signal,
   wherein the detecting whether the signal is received comprises: retransmitting the control signal to the signal receiver if it is determined that there is no change in whether the tuner receives a signal, and
   wherein the retransmitting comprises:
   stopping retransmitting the control if a number of times of retransmitting the control signal is greater than a predetermined number of times, and
   informing of an error in connection with the signal receiver.

17. A control method of a display apparatus, comprising:
   receiving a signal containing an image from a signal receiver;
   processing the image to be displayed;
   storing characteristic information of a channel corresponding to the image;
   transmitting a control signal for changing the channel to the signal receiver;
   extracting channel information contained in a signal received from the signal receiver after transmitting the control signal;
   comparing the extracted channel information and the characteristic information of the channel; and
   controlling the channel to be changed based on comparison results,
   wherein the comparing comprises retransmitting the control signal to the signal receiver if the extracted channel information and the stored characteristic information of the channel are not the same, and
   wherein the retransmitting comprises:
   stopping retransmitting the control if a number of times of retransmitting the control signal is greater than a predetermined number of times, and
   informing of an error in connection with the signal receiver.

18. The display apparatus according to claim 1, further comprising:
   a storage which is configured to store the characteristic information of the channel corresponding to the image.

19. The display apparatus according to claim 1, wherein the signal receiver comprises a satellite signal receiver.

20. The control method according to claim 10, wherein the signal receiver comprises a satellite signal receiver.

21. The display apparatus according to claim 1, wherein the controller is configured to extract channel information contained in a signal received from the signal receiver after transmitting the control signal, and to compare the extracted channel information with characteristic information of the channel corresponding to a displayed image before transmitting the control signal, and to determine that a channel has been changed on the basis of the comparison.

22. The method according to claim 10, the method further comprising:
   storing characteristic information of a channel corresponding to an image displayed before transmitting the control signal;
   extracting channel information contained in a signal received from the signal receiver after transmitting the control signal;
   comparing the extracted channel information and the characteristic information of the channel; and
   determining that a channel has changed on the basis of the comparison.

* * * * *